Dec. 31, 1929.   K. E. LYMAN ET AL   1,741,859
AUTOMATIC TRANSMISSION
Filed July 19, 1928   4 Sheets-Sheet 1

INVENTORS
KENNETH E. LYMAN
ALBERT M. LANE
BY
ATTORNEY

Dec. 31, 1929.   K. E. LYMAN ET AL   1,741,859
AUTOMATIC TRANSMISSION
Filed July 19, 1928   4 Sheets-Sheet 2
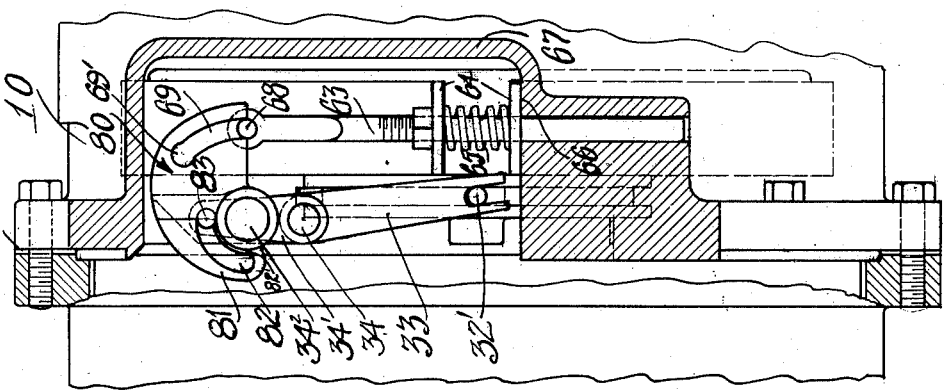
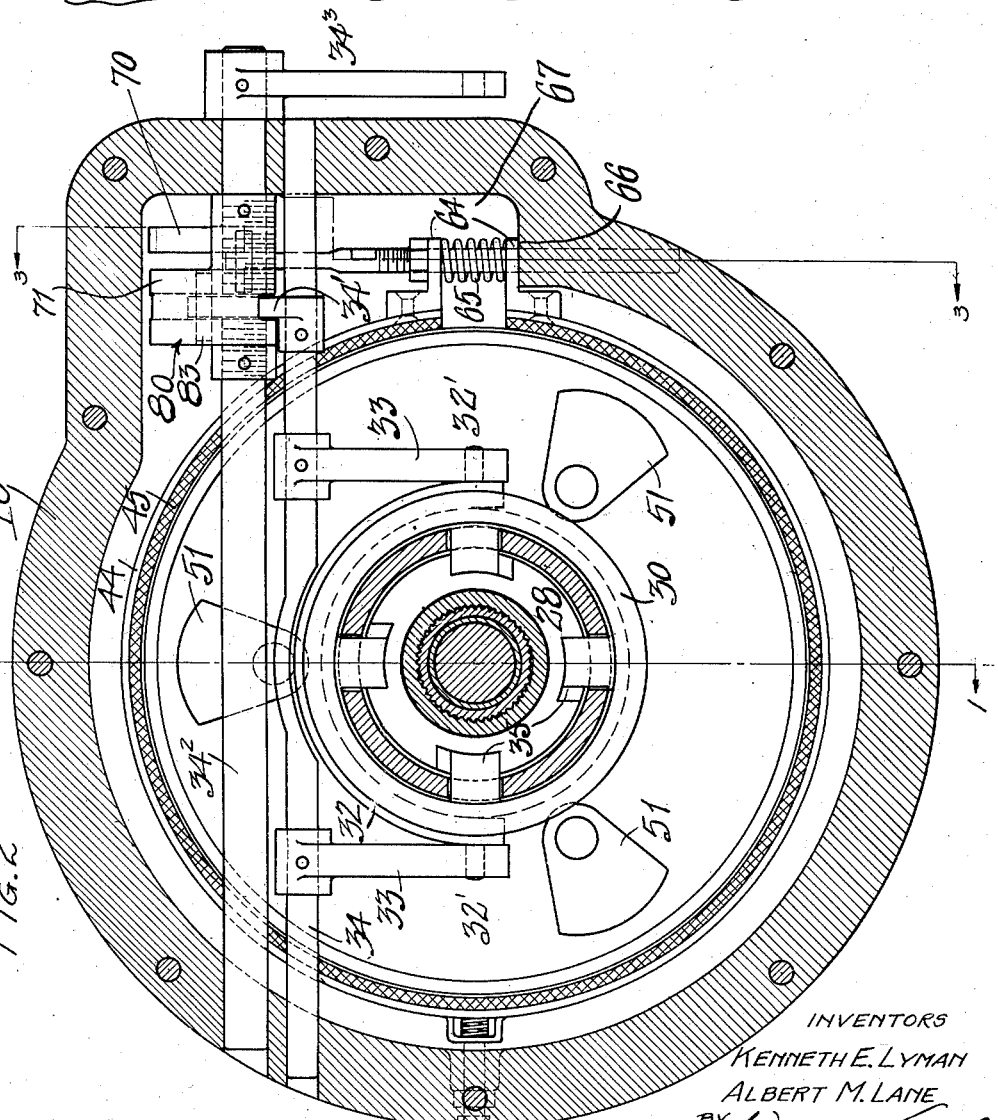
INVENTORS
KENNETH E. LYMAN
ALBERT M. LANE
BY
ATTORNEY Dec. 31, 1929.  K. E. LYMAN ET AL  1,741,859
AUTOMATIC TRANSMISSION
Filed July 19, 1928   4 Sheets-Sheet 3
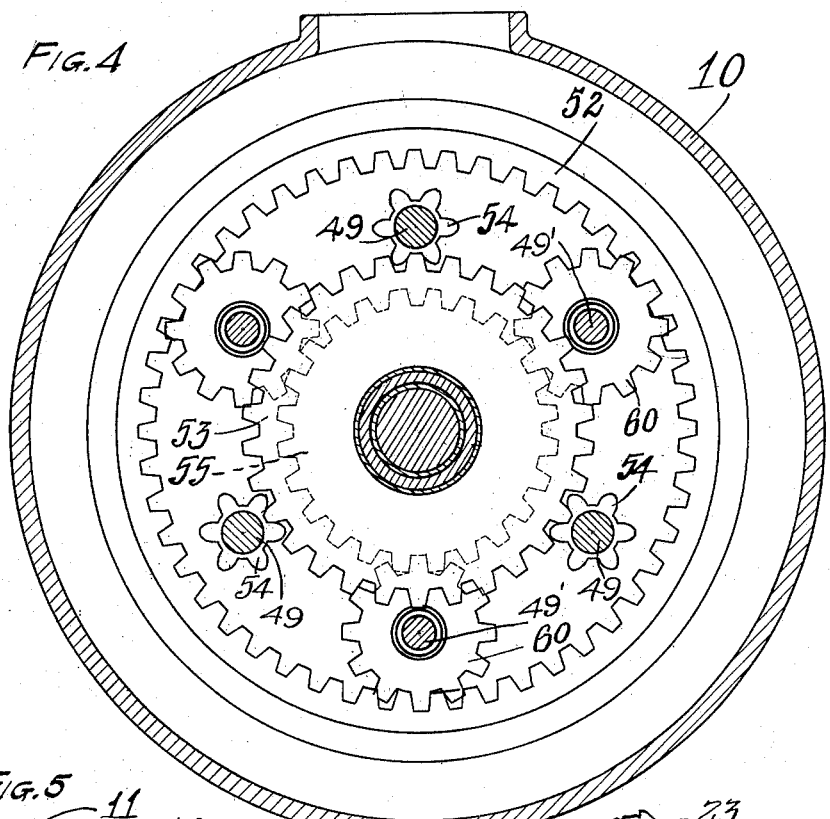
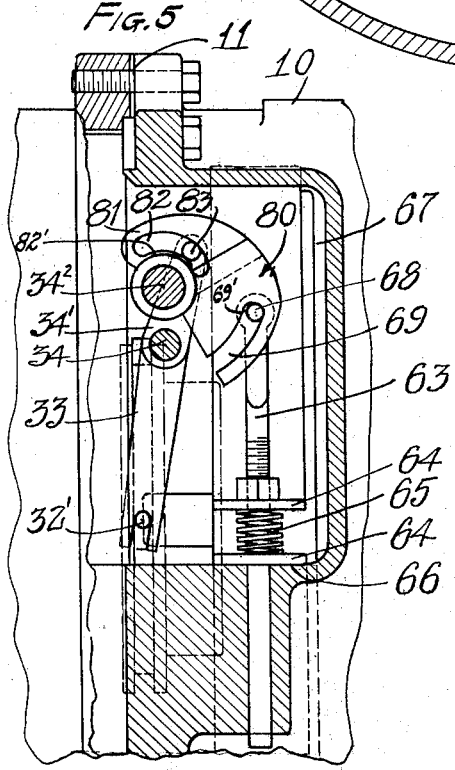
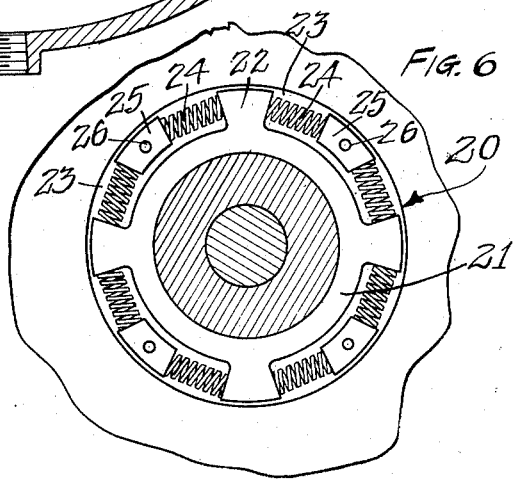
INVENTORS
KENNETH E. LYMAN
ALBERT M. LANE
BY
ATTORNEY Patented Dec. 31, 1929

1,741,859

UNITED STATES PATENT OFFICE

KENNETH E. LYMAN AND ALBERT M. LANE, OF ROCKFORD, ILLINOIS, ASSIGNORS TO AUTOMATIC TRANSMISSION COMPANY, OF ROCKFORD, ILLINOIS, A CORPORATION OF ILLINOIS

AUTOMATIC TRANSMISSION

Application filed July 19, 1928. Serial No. 293,866.

The present invention relates in general to power transmitting mechanisms and has particular reference to an improved transmission which is especially adaptable for use with motor driven vehicles.

The principal object of the invention resides in the provision of a mechanism of the character described which is capable of establishing a gradual speed ratio variation from zero to maximum controlled automatically by the variations in speed and torque between a driving element and an element to be driven.

While the foregoing explains briefly the nature of the invention other objects and advantages not herein specifically referred to will be readily appreciated upon a full comprehension of the novel features presented in the construction, arrangement and manner of operation of the transmission.

In order that the invention may be readily understood an embodiment of the same is set forth in the accompanying drawings and in the following detailed description.

It is understood that those skilled in the art may make various changes in the construction and arrangement of the parts without departing from the spirit and scope of the invention as defined in the subjoined claims, and we therefore do not wish to be restricted to the precise construction contained herein.

In the drawings:

Fig. 2 is a cross section taken on the line 2—2, Fig. 1.

Fig. 3 is a detailed view of a section taken on the line 3—3, Fig. 2.

Fig. 4 is another sectional view taken on the line 4—4, Fig. 1.

Fig. 5 is a view similar to Fig. 3 but showing the brake actuating mechanism in an active or operating position.

Fig. 6 is a detailed view taken on the line 6—6, Fig. 1 showing the flexible connection for connecting the driving shaft with the transmission and, Fig. 7 is a view similar to Fig. 1 but showing one modified embodiment of the invention.

Figure 1:
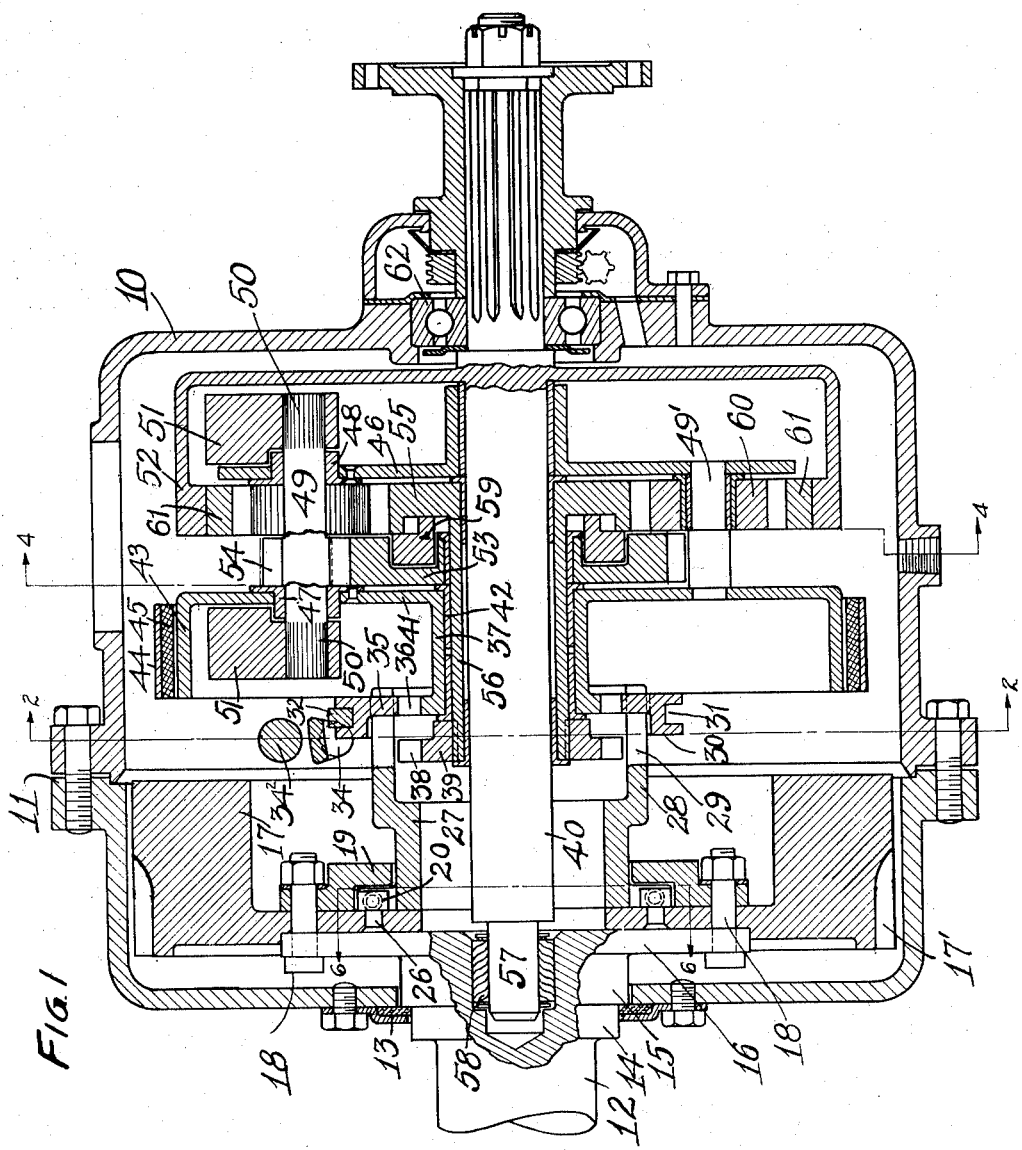
Fig. 1 is a longitudinal section of a transmission embodying the salient features of one form of our invention, the section having been taken on the line 1—1 Fig. 2.

Referring now to the drawings in detail 10 represents a housing in which the transmission is inclosed. The housing is preferably constructed in two parts with the parts joined as at 11. The driving shaft 12 extends through an opening in one side of the housing 10. A packing gland 13 is provided to prevent the escape of lubricant through the opening and in this connection the driving shaft may be made with stepped diameters 14 and 15, the larger one of which carrying the radial flange 16. This flange is secured to the fly-wheel 17 by bolts or the like 18 and the same bolts are employed for securing the backing member of the flexible driving connection to the side of the fly-wheel opposite to the position of the flange 16. The backing member 19 is constructed in any manner suited for the purpose and comprising as an example a disc-like plate having a rabbeted periphery so that the bolts and the nuts thereon terminate substantially flush with the face of the plate.

The inner peripherial edge of the plate is also rabbeted to provide an annular undercut recess in which is mounted the flexible driving connection 20. As best illustrated in Fig. 6, this driving connection comprises a ring like member 21 having radial projections 22, arranged in circular spaced relation to one another so as to provide relatively long recesses 23 at intervals around the device. Each of these spaces 23 are made to accommodate a pair of compression springs 24 one end of each of these springs abuts against the projections 22 with their inner or opposite ends terminating in abutting relation with the opposed sides of blocks 25 which are anchored in place by pins 26. The pins 26 extend into the flange of the fly-wheel 17 and are thus rigidly fixed in place. The ring member 21 is keyed or otherwise fixed in relation to the sleeve part 27 of a projecting cup shaped flange 28. In this way the sleeve 27 is fixed in driving relation to the fly-wheel 17 which in turn is mounted in fixed relation to the driving shaft 12. A flexible connection provided by the springs 24 make it necessary for the torque of the driving shaft to take up the compression of the springs 24 before a positive drive is imparted to the sleeve 27. The purpose of this flexible driving connection is to absorb, so to speak, or at least eliminate pulsations in the drive between the driving shaft 12 and the gear train of the transmission. The engine pulsations will not therefore be transmitted to the transmission and it will result in delivering power to the transmission with a constant torque.

The sleeve 27 as stated terminates in the forwardly projecting cup shaped flange 28, the same being constructed with diametrically opposed open slots 29. Encircling this cup shaped flange is a control collar 30, the same being provided on its outer circumference with an annular groove 31 made to receive a fork 32, the opposite ends of which carrying pins 32' which are received in the open slots of a pair of actuating levers 33 which are suspended from and fixed to a freely rotatable rod 34 which extends across housing. The freely rotatable rod 34 carries an arm 34', the end of which being secured in operating relation to a manually manipulated rod or shaft 34² through the medium of a mechanism which will be hereinafter described. Mounted on the end of the rod 34² is an operating arm 34³ which is made to be connected with the manually operable lever positioned conveniently accessible to the operator. The operator's manipulation of this hand lever will impart the necessary movement to the control collar 30 to move the same into one of three operating positions which it is adapted to occupy on the cup shaped flange 28. One of these positions is a forward drive, another a reversing drive and the third a neutral position.

The inner circumference of the collar 30 is made with diametrically opposed clutch teeth or lug 35 which are mounted free to slide in the slots 29. These lugs or teeth 35 thus mount the collar 30 on the cup shaped flange 28 so that it is restrained to rotate therewith but is free to slide relatively thereof. The teeth or lugs 35 above referred to are intended to selectively mesh with the ratchet teeth 36 on the sleeve 37 or else the teeth 38 on the reverse ring 39.

In other words the collar 30 as shown in Fig. 1 is assuming a position which it must for imparting forward drives through the mechanism. It is, therefore, in mesh with the teeth 36 of the sleeve 37. As the collar is manipulated to present the lugs 35 intermediate the position of the teeth 36 and 38 it will be out of engagement so that no drive will be delivered beyond the cup shaped flange 28. If it were moved rearwardly of the neutral position it would engage the clutch teeth 38 on the ring 39 and a reverse drive would be established in the transmission.

While the transmission embodying the present invention has been designed primarily for its automatic features, it should be pointed out that it is non-automatic so far as concerns changing from a forward to a reverse drive as this operation does require manual effort on the part of the operator as previously stated. Otherwise the operation of the transmission is entirely automatic and unusually effective as well.

The sleeve 37 is journaled indirectly on the driven shaft 40 and extends forward to terminate in a planet spider 41. A suitable bushing 42 is provided for the sleeve, the same being interpositioned between the sleeve and another sleeve which will be hereinafter described.

The spider 41 is made with a brake drum 43 which is encircled by a brake band 44 having a brake lining 45. The purpose of this braking device will be presently described.

Also journaled on the drive shaft 40 is another part 46 of the spider 41. The parts 41 and 46 of the spider are made with journal bearings 47 and 48 respectively, the same being arranged in axially aligned pairs and constructed to accommodate the secondary planet shafts 49. The opposite ends of these planet shafts 49 terminate in mounting ends 50 for the centrifugal weights 51 which are splined or otherwise mounted in fixed relation to the planet shafts.

It should be noted that each of the planet shafts 49 carry a pair of these centrifugal weights. The weights on one side of the spider are mounted within the boundary of the brake drum on the spider whereas the weights on the opposite side of the spider are mounted within a ring gear 52. This particular assembly is specifically mentioned because one of the important features of the present invention is to house all the mechanical or operating parts of the transmission within a comparatively limited housing area so as to provide a very compact transmission. The ring gear 52 is fixed in driving relation to the driving shaft 40.

Mounted with freedom of rotation on the bushing 42 is a secondary sun gear 53, the teeth thereof being in constant mesh with the teeth on the secondary planet gears 54. These secondary gears 54 are splined on the planet shafts 49. Coaxially mounted with respect to the secondary sun gear 53 is a primary sun gear 55, the same being of smaller diameter than the secondary sun gear 53. The sun gear 55 has a sleeve 56 which extends along the driven shaft 40 and terminates in a mounting for the reverse ring 39. It will thus be seen that for reversing the drive through the transmission, the drive is taken in through the primary sun gear 55, whereas forward drives as previously stated are taken in through the spider 41. It should be mentioned here that the end of the driven shaft 40 is made with a reduced diameter 57 which is journaled in a bearing 58 housed within an axial bore in the driving shaft 12. Practically all of the operating mechanism of the transmission is journaled on the driven shaft with the exception of the ring gear 52 which is mounted to rotate therewith. The primary sun gear 55 is connected to the secondary sun gear 53 through the medium of an over-running or one-way clutch mechanism 59.

The reason for this clutch mechanism is to enable the secondary sun gear to rotate in advance of the primary sun gear so as to avoid transmitting the accelerating forces developed by the weights 51 to the planetating movement in the primary planetary system as will be more fully hereinafter described.

Mounted with freedom of rotation on the primary planet shafts 49' are a series of primary planet gears 60. These planet gears 60 are in constant mesh with the teeth on the primary sun gear 55 and also in mesh with the teeth 61 on the ring gear 52.

Considering now that the transmission is set for forward drives as shown in Fig. 1, the drive will be taken in on the spider 41 which will be caused to rotate; the brake mechanism being released at this time for forward speeds to permit it to rotate. Rotation of the spider 41 will set in motion both planetary systems including the weights 51 and as the weights develop momentum from the speed of the driving shaft they will operate to transmit a retarding effect in the planetating movement of the primary planetary system which effect will operate to pick up the ring gear 52 and impart rotation to the driven shaft 40. As the speed of the driving shaft increases and the torque or counter resistance in the driven shaft decreases, the weights will increase the retarding effect in the primary system increasing the speed of the ring gear and consequently the driven shaft. When the speed and torque of the shafts become substantially balanced, the planetating movement will have been totally arrested and a one to one drive established in the transmission. As previously mentioned the over-running clutch 59 nullifies, so to speak, the accelerating force developed by the weights so that only a retarding force is imparted to the primary planetary system. It will thus be seen that there is no decided accelerating effect developed in the primary system and as a result the retarding effect is substantially continuous, which is very much more effective than if the planetating movement was alternatingly retarding and accelerating.

It is of course realized that until the ring gear has been picked up to an extent that a unitary drive is established, the torque of the drive through the transmission is multiplied by the gear ratio. Furthermore, it should be noted that the change in speed ratio from zero to maximum is carried out as a steadily increasing power force provided; of course, the increase in the speed of the driving shaft is constant.

In other words, so long as the speed of the driving shaft is constantly increasing there are no interrupted stages in the power delivered through the transmission. The same principle applies equally well in going from a one to one drive back into a variable speed ratio.

Attention is also directed to the ratio of the secondary planet gears 54 relative to the primary planet gears 60 and the difference in size or ratio between the primary and secondary sun gears. These gear ratios also cooperate in the combination to develop unusual effectiveness in the operation of the mechanism and they have been worked out to develop efficient operation.

The construction, operation and advantages of the overrunning clutch mechanism is fully explained and better illustrated in a co-pending application, Serial No. 291,298, filed July 9, 1928, by one of the present inventors and Roger B. McMullen, Jr., as joint inventors, and reference may be had to said application for any specific construction of the present clutch mechanism which is not fully explained herein.

The driven shaft 40 is journaled in the ball-bearings 62 in an opening in the housing 10 opposite to that through which the driving shaft projected into the housing.

Figure 7:
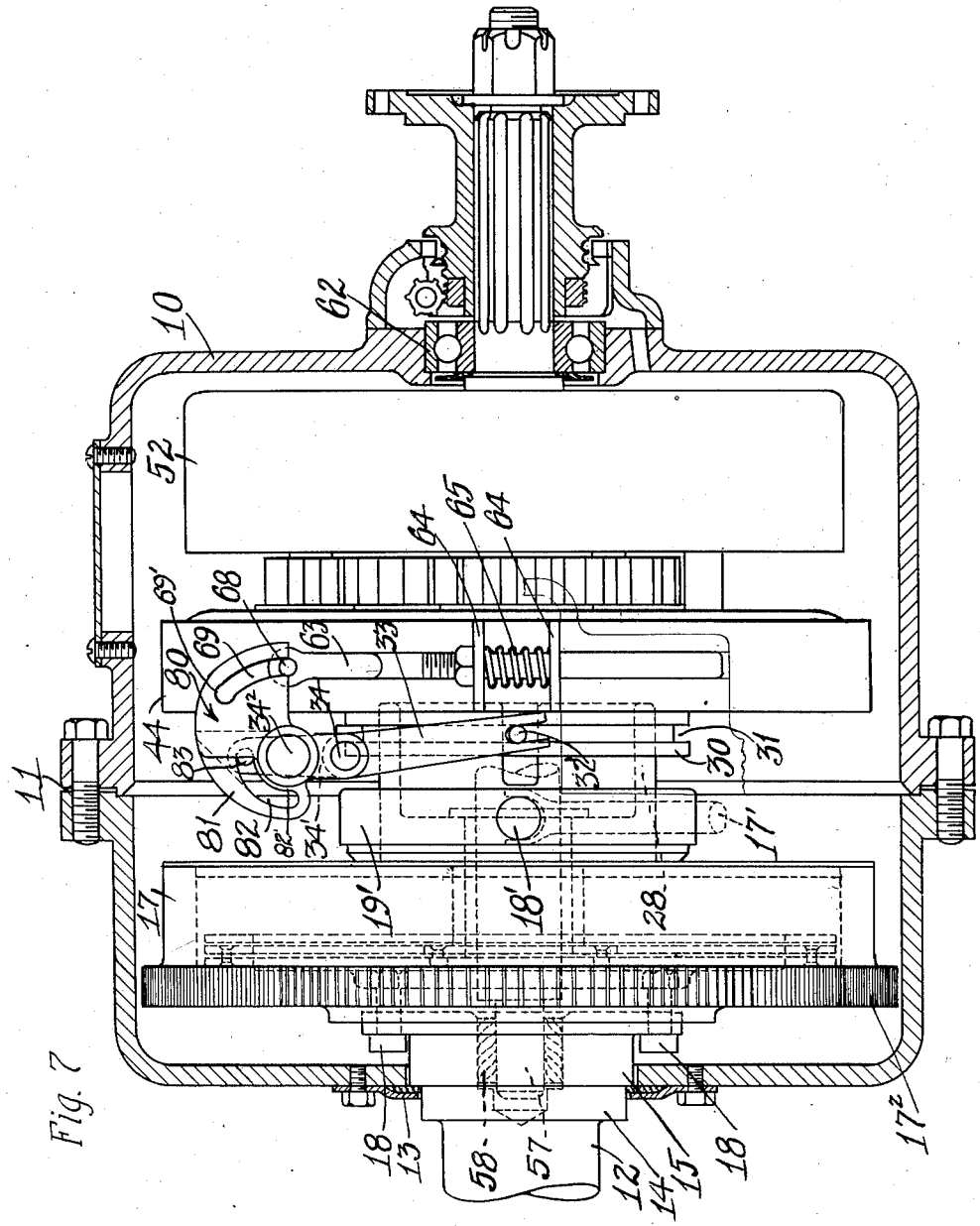

In Fig. 7 we have illustrated a modified embodiment of the invention in which a clutch is included in the assembly, the same being combined with the fly-wheel 17 and operating through the medium of the manually manipulated fork 17' which is adapted to embrace the trunnions 18' on opposite sides of the axially shiftable clutch ring 19'. Any standard type of automobile clutch suitable for the purpose may be employed in this combination.

It is simply desired to show how compact an automatic transmission may be made in accordance with the invention when combined with or in the absence of a clutch. Even with a clutch the space required to house the transmission is very small and all of the necessary parts of the assembly may be inclosed in this small housing and without sacrificing ruggedness in construction, and is a practical design both as to detail and general assembly. The teeth 17² on the outer peripherial edge of the fly-wheel 17 are for the self-starter device.

Referring to another important feature of the invention, it should be explained that to establish a reverse drive through the transmission it is necessary to arrest rotation of the spider 41 and this accounts for the brake mechanism. The control ring 30 as previously stated is moved to mesh the lugs or teeth 35 with the teeth 38 on the ring 39. This will take the drive into the primary sun gear 55 and reverse the direction of rotation of the driven shaft 40.

We have developed a brake mechanism which is automatically actuated to apply the brake device for arresting rotation of the spider 41 when the control collar 30 is shifted into the reversing position. This automatically operated brake applying and releasing mechanism includes an actuating rod 63 which projects through the attaching ears 64 of the brake band 44. Interposed between the ears 64 is a compression spring 65 which normally exerts an influence on the ears to spread them apart and retain the brake band loose on the drum 43.

The rod 63 serves when actuated to overcome the resistance of the spring 65 and impart a thrust to the upper ear and move it toward the lower ear which is seated on a ledge or shoulder 66 formed as a part of an extension 67 on the housing 10. The upper end of the rod 63 carries a pin 68 which is adapted to operate in a pair of curved slots 69 in the two parts 70 and 71 of a cam head 80. The part 71 of the camming head is made with a divided tail piece 81, each of the divisions thereof having a camming slot 82 in which the ends of a pin 83 are mounted to slide. The pin 83 is carried by the arm link 34′ previously mentioned.

With the construction above described attention is now directed to the operation of the mechanism for going into reverse and arresting the rotation of the spider. To begin with, both operations are performed in one and the same manual manipulation of the lever 34³. When this lever 34³ is actuated the camming head 80 will be rotated in a clock-wise direction, viewed from Fig. 7. Rotation of the shaft 34 to shift the collar 30 is effected through means of the arm or link connection 34′ which carries the pin 83. At forward speeds the pin 83 is seated in the camming slots 82 below the shoulders of the raised camming surfaces 82′.

Movement of the head 80 in a clock-wise direction will rock the shaft 34 through its connection with the arm or link 34′. When the reversing connection has been made, the pin 68 will be at its limit of movement in the slots 69 so that further movement of the head will impart the required thrust to the rod 63. When the brake is off as shown by the position of the head 80 in Fig. 3, the pin 83 is at rest behind the shoulders made at the end of the camming surfaces 82′. For the first 15° of rotation of the head the pin will remain seated behind the shoulders, beyond this it will ride the surfaces due to the variation in the arc described by the rotation of the head and the radius of the arc in which the pin is movable. It should also be noted that the end of the slots 69 are enlarged as at 69′ so as to properly accommodate the pin 68 at the limit of rotation of the head.

From the above it will be seen that while the collar is shifted and the brake applied in one and the same manual operation, the operation is performed in sequence or successively, first the collar is shifted and then the brake applied.

Another important feature of this invention which merits consideration from a practical view point, is the possibility of manually selecting one of a plurality of torque multiplication for the variable speed gear ratio. It has already been explained that when the forward speed is taken in on the spider, a torque multiplication is realized. It has also been explained that before the rotation of the spider is arrested for reverse drives, the clutching engagement is made with the sun gear. If the manually operated lever is manipulated far enough to make the clutching engagement between the collar 30 and the sun gear, but not far enough to apply the brake mechanism for arresting the rotation of the spider, a larger multiplication of torque will be derived than would be possible by taking the drive in on the spider. It is, of course, understood that the drive will be forward until the rotation of the spider has been completely arrested. It will thus be seen that by taking the forward drive in on the spider, a multiplication of torque is developed for forward speeds and that a greater multiplication of torque can be realized by taking the drive in on the sun gear. No reversal of the drive will be developed through the sun gear until the rotation of the spider has been completely arrested as explained. Furthermore, by retarding, without completely arresting the rotation of the spider, still another multiplication of torque may be developed and the speed ratio in this connection as well as the other speed ratios are entirely under control of the operator and may be selectively employed.

Having thus described and shown an embodiment of our invention, what we claim and desire to secure by Letters Patent of the United States is:

1. In a transmission, driving and driven shafts, and automatic planetary change speed mechanism connecting said shafts, a fly-wheel on the driving shaft, a manually operated clutch associated with said fly-wheel, a manually operated clutching connection between the driving shaft and the planetary change speed mechanism, a flexible drive between the drive shaft and said manually operable clutching connection, a spider in said change speed mechanism coacting with said manually operable clutching means and through which forward speeds are taken into the change speed mechanism, a sun gear in said change speed mechanism through which reversing speeds are taken into the mechanism, said sun gear having drive reversing means also coacting with said manually operable clutching means, a ring gear in said change speed mechanism, planet gears meshing with said ring gear and said sun gear, a secondary sun gear and secondary planet gears for imparting forward drives to said first named sun gear from said spider, and centrifugal weights operated by the rotation of the said spider for developing a retarding effect in the planetating movement of the primary planetating gears.

2. In a transmission, driving and driven shafts, planetary change speed mechanism for connecting said shafts in different speed ratios and means for automatically changing the ratio, comprising in combination, a sun gear, planet gears meshing with said sun gear, a ring gear meshing with said planet gears, means for connecting the ring gear with the driven shaft, a planet carrier for the planet gears, means for selectively connecting either the sun gear or planet carrier with the driving shaft for forward speeds, means for holding the planet carrier for reversing speeds, a centrifugal device mounted in said mechanism and a control transmitting connection between said device and the planetating members in said mechanism, comprising a gear train and a one-way clutch connecting said gear train with said sun gear.

3. In a transmission, driving and driven shafts, planetary change speed mechanism for connecting said shafts in different speed ratios and means for automatically changing the ratio, comprising in combination, a sun gear, planet gears meshing with said sun gear, a ring gear meshing with said planet gears, means for connecting the ring gear with the driven shaft, a planet carrier for the planet gears, means for selectively connecting either the sun gear or planet carrier with the driving shaft for forward speeds, means for holding the planet carrier for reversing speeds, a centrifugal device mounted in said mechanism and a control transmitting connection between said device and the planetating members in said mechanism, comprising a gear train, a secondary sun gear functioning as an element in said gear train and a one-way clutch connecting said secondary sun gear with said first named sun gear.

4. In a transmission, driving and driven shafts, planetary speed changing mechanism for connecting said shafts in different speed ratios and means for automatically changing the ratio, comprising in combination a sun gear, planet gears meshing with said sun gear, a ring gear meshing with said planet gears, means for connecting the ring gear with the driven shaft, a planet carrier for the planet gears, means for selectively connecting either the sun gear or planet carrier with the driven shaft for establishing different multiplications of torque at forward speeds, means for controlling the rotation of the planet carrier when the sun gear is connected to the driving shaft; whereby other variable multiplications of torque may be selectively established or the drive reversed, a centrifugal device mounted in said mechanism and a control transmitting connection between said device and the planetating members in said mechanism.

5. In a transmission, driving and driven shafts, planetary speed changing mechanism for connecting said shafts in different speed ratios and means for automatically changing the ratio, comprising in combination a sun gear, planet gears meshing with said sun gear, a ring gear meshing with said planet gears, means for connecting the ring gear with the driven shaft, a planet carrier for the planet gears, means for selectively connecting either the sun gear or planet carrier with the driving shaft for establishing different multiplications of torque at forward speeds, means for controlling the rotation of the planet carrier when the sun gear is connected to the driving shaft; whereby other variable multiplications of torque may be selectively established or the drive reversed, a centrifugal device mounted in said mechanism and a control transmitting connection between said device and the planetating members in said mechanism, comprising a gear train and a one-way clutch connecting said gear train with said sun gear.

6. In a transmission, driving and driven shafts, planetary speed changing mechanism for connecting said shafts in different speed ratios and means for automatically changing the ratio, comprising in combination a sun gear, planet gears meshing with said sun gear, a ring gear meshing with said planet gears, means for connecting the ring gear with the driven shaft, a planet carrier for the planet gears, means for selectively connecting either the sun gear or planet carrier with the driving shaft for establishing different multiplications of torque at forward speeds, means for controlling the rotation of the planet carrier when the sun gear is connected to the driving shaft; whereby other variable multiplications of torque may be selectively established or the drive reversed, a centrifugal device mounted in said mechanism and a control transmitting connection between said device and the planetating members in said mechanism, comprising a gear train, a secondary sun gear functioning as an element in said gear train and a one-way clutch connecting said secondary sun gear with said first named sun gear.

7. In a transmission and in combination, driving and driven elements, speed changing mechanism for connecting said elements in variable speed ratios, means for automatically changing the ratio, means for operating said mechanism with different multiplications of torque at speed ratios, means for manually selecting the torque multiplication, and means for reversing the drive in said mechanism.

8. In a transmission, and in combination driving and driven elements, speed changing mechanism for connecting said elements in different speed ratios, means for automatically changing the ratio, means for manually reversing the drive in said mechanism and means for manually selecting the torque multiplication with which the mechanism operates at variable speed ratios, comprising a manually selectable sun gear and planet carrier drive and means for manually controlling the planet carrier when the sun gear drive has been selected.

9. An automatic planetary transmission, comprising in combination sets of sun gears of different diameter, sets of planet gears also of different diameter, the larger set of planet gears meshing with the smaller sun gears and the smaller set of planet gears meshing with the larger of the sun gears, planet shafts for said planet gears, centrifugal weights on said planet shafts, and means for transmitting the drive from a driving shaft through said transmission to a shaft to be driven.

10. In a transmission and in combination, driving and driven elements, speed changing mechanism for connecting said elements in variable speed ratios, means for operating said mechanism with different multiplications of torque at speed ratios, means for changing the torque multiplication, and means for automatically changing the ratio.

11. In a transmission, driving and driven elements, speed changing gearing for connecting said elements in variable driving ratios, manually operable means for selectively connecting certain members in said gearing with the driving element for developing different multiplications of driving torque at forward speeds, means for arresting the rotation of one of said members when it is released from driving relation with the driving element for reversing the drive between the driving and driven elements and means effective only at forward speeds for automatically changing the driving ratio between the driving and driven elements.

12. In a transmission, driving and driven elements, speed changing gearing for connecting said elements in variable driving ratios, manually operable means for selectively connecting certain members in said gearing with the driving element for developing different multiplications of driving torque at forward speeds, means for retarding the rotation of one of said selectable members when released from driving relation with the driving element for further varying the multiplication of the driving torque in said gearing, said means functioning also as means for arresting the rotation of said retardable member for reversing the drive between the driving and driven elements and means for changing the ratio between the driving and driven elements effective only when the drive is forward.

13. In a transmission, driving and driven elements, speed changing gearing for connecting said elements in variable driving ratios, means for selectively connecting certain members in said gearing with the driving element for developing different multiplications of driving torque at forward speeds, means for arresting the rotation of one of said members when it is released from driving relation with the driving element for reversing the drive between the driving and driven elements, a manually operable unitary control for operating said selective connecting means and said arresting means and means effective only at forward speeds for automatically changing the driving ratio between the driving and driven elements.

14. In a transmission, driving and driven elements, planetary change speed mechanism for connecting said elements in variable speed ratios, a sun gear and a planet carrier in said mechanism, manually controlled means for selectively connecting either the planet carrier or the sun gear with the driving element for effecting a change in the torque multiplication with which the mechanism operates at variable speed ratios, and means for automatically changing the speed ratio.

In testimony whereof we have hereunto subscribed our names.

KENNETH E. LYMAN.
ALBERT M. LANE.